United States Patent
Shi et al.

(10) Patent No.: US 10,868,606 B2
(45) Date of Patent: Dec. 15, 2020

(54) METHOD FOR CALCULATING CHANNEL QUALITY INDICATOR (CQI), TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/826,588

(22) Filed: Mar. 23, 2020

(65) Prior Publication Data

US 2020/0220601 A1 Jul. 9, 2020

Related U.S. Application Data

(63) Continuation of application No. PCT/CN2017/105000, filed on Sep. 30, 2017.

(51) Int. Cl.
| | | |
|---|---|---|
| *H04B 7/06* | (2006.01) | |
| *H04B 7/0456* | (2017.01) | |
| *H04W 76/27* | (2018.01) | |
| *H04L 5/00* | (2006.01) | |

(52) U.S. Cl.
CPC ......... *H04B 7/0632* (2013.01); *H04B 7/0486* (2013.01); *H04B 7/0626* (2013.01); *H04L 5/0051* (2013.01); *H04W 76/27* (2018.02)

(58) Field of Classification Search
CPC .. H04B 7/0632; H04B 7/0486; H04B 7/0626; H04W 76/27; H04L 5/0051
See application file for complete search history.

(56) References Cited

U.S. PATENT DOCUMENTS

| | | | |
|---|---|---|---|
| 2013/0322376 A1 | 12/2013 | Marinier et al. | |
| 2015/0358060 A1 | 12/2015 | Park et al. | |
| 2017/0353222 A1* | 12/2017 | Wei | H04B 7/06 |
| 2019/0149290 A1* | 5/2019 | Liu | H04L 5/00 |

FOREIGN PATENT DOCUMENTS

| | | |
|---|---|---|
| CN | 101753188 A | 6/2010 |
| CN | 103220068 A | 7/2013 |
| CN | 103391126 A | 11/2013 |

(Continued)

OTHER PUBLICATIONS

International Search Report dated May 30, 2018 of PCT/CN2017/105000.

(Continued)

*Primary Examiner* — Ronald B Abelson
(74) *Attorney, Agent, or Firm* — Perkins Coie LLP

(57) ABSTRACT

Disclosed is a method for calculating a channel quality indicator (CQI), a terminal device, and a network device. The method comprises: the terminal device determines, from N ports, K ports used for calculating a CQI; the terminal device calculates the CQI based on the K ports; and the terminal device reports the CQI and a rank to the network device, the rank being equal to K.

16 Claims, 3 Drawing Sheets

(56) References Cited

FOREIGN PATENT DOCUMENTS

EP          3125456  A1    2/2017
WO     2017152415  A1    9/2017

OTHER PUBLICATIONS

3GPP TSG RAN WG1 Meeting NR#3 Nagoya, Japan Sep. 18-21, 2017—Agenda Item: 6.2.2.1—R1-1716804, Way forward on reciprocity based CSI v3 (3 pages).
Supplemental International Search Report dated Dec. 16, 2019 of PCT/CN2017/105000 (7 pages).
Examination Report of European Application No. 17926622.6 dated Oct. 13, 2020 (5 pages).

* cited by examiner

200

A terminal device determines K ports used to calculate a CQI in N ports — 210

The terminal device calculates the CQI based on the K ports — 220

The terminal device reports the CQI and a rank to a network device, where the rank is equal to K — 230

METHOD FOR CALCULATING CHANNEL QUALITY INDICATOR (CQI), TERMINAL DEVICE, AND NETWORK DEVICE

CROSS-REFERENCE TO RELATED APPLICATION

This is a continuation application of International PCT Application No. PCT/CN2017/105000, having an international filing date of Sep. 30, 2017, the entire content of which is hereby incorporated by reference.

TECHNICAL FIELD

Implementations of this application relate to the wireless communications field, and more specifically, to a method for calculating a CQI, a terminal device, and a network device.

RELATED ART

In uplink control information, a channel quality indicator (Channel Quality Indicator, CQI) is used to reflect channel quality. Compared with a Long Term Evolution (Long Term Evolution, LTE) communications system, a probability of using multi-user multiple-input multiple-output (Multi-User Multiple-Input Multiple-Output, MU-MIMO) in a future communications system is greatly increased. Therefore, a network needs to obtain a more precise CQI to optimize MU-MIMO transmission, thereby improving communication performance of the system.

SUMMARY

Implementations of this application provide a method for calculating a CQI, a terminal device, and a network device.

According to a first aspect, a method for calculating a CQI is provided. The method includes: determining, by a terminal device, K ports used to calculate a channel quality indicator CQI in N ports; calculating, by the terminal device, the CQI based on the K ports; and reporting, by the terminal device, the CQI and a rank to a network device, where the rank is equal to K, and K and N are positive integers.

Therefore, the terminal device calculates the CQI based on the K ports in the N ports, to obtain a more precise CQI, thereby improving communication performance.

In an implementation, the determining, by a terminal device, K ports used to calculate a CQI in N ports includes: selecting, by the terminal device, the preconfigured K ports from the N ports according to the rank.

In an implementation, port numbers of the K ports are 0 to K−1, or N−K to N−1.

In an implementation, if K is an odd number, the port numbers of the K ports are 0 to K−1; or if K is an even number, the port numbers of the K ports are N−K to N−1; or if K is an even number, the port numbers of the K ports are 0 to K−1; or if K is an odd number, the port numbers of the K ports are N−K to N−1.

In an implementation, the method further includes: sending, by the terminal device, information about the selected K ports to the network device.

In an implementation, before the determining, by a terminal device, K ports used to calculate a CQI in N ports, the method further includes: receiving, by the terminal device, first configuration information sent by the network device, where the first configuration information is used to indicate the information about the K ports; and the determining, by a terminal device, K ports used to calculate a CQI in N ports includes: determining, by the terminal device, the K ports in the N ports according to the first configuration information.

In an implementation, the first configuration information includes a target port configuration used to calculate the CQI, the target port configuration includes correspondences between a plurality of ranks and a plurality of port sets, and port sets corresponding to different ranks in the plurality of ranks include different quantities of ports; and the determining, by the terminal device, the K ports in the N ports according to the first configuration information includes: determining, by the terminal device according to the target port configuration and the rank, a first port set corresponding to the rank, where the first port set includes the K ports.

In an implementation, the first configuration information includes identification information of the target port configuration used to calculate the CQI, and the identification information is used to identify the target port configuration; and the determining, by the terminal device, the K ports in the N ports according to the first configuration information includes:
determining, by the terminal device according to the identification information, the target port configuration indicated by the identification information in a plurality of port configurations, where each of the plurality of port configurations includes correspondences between a plurality of ranks and a plurality of port sets, and in each port configuration, port sets corresponding to different ranks include different quantities of ports; and
determining, by the terminal device according to the target port configuration and the rank, a first port set corresponding to the rank, where the first port set includes the K ports.

In an implementation, before the receiving, by the terminal device, first configuration information sent by the network device, the method further includes: receiving, by the terminal device, second configuration information sent by the network device, where the second configuration information includes the plurality of port configurations.

In an implementation, the receiving, by the terminal device, second configuration information sent by the network device includes: receiving, by the terminal device, the second configuration information sent by the network device by using Radio Resource Control RRC signaling and a MAC control element MAC CE.

In an implementation, the receiving, by the terminal device, first configuration information sent by the network device includes: receiving, by the terminal device, the first configuration information sent by the network device by using RRC signaling, a MAC CE, or downlink control information DCI.

In an implementation, port numbers of the K ports in the first port set are consecutive.

In an implementation, the port numbers of the K ports in the first port set are consecutive, a smallest port number M in the port numbers of the K ports satisfies M mod K=0, and M is a natural number.

In an implementation, port numbers of the K ports are 0 to K−1, or N−K to N−1.

In an implementation, the method further includes: receiving, by the terminal device, update configuration information sent by the network device, where the update configuration information includes a second port set corresponding to the rank in the target port configuration; and updating, by the terminal device, the first port set corresponding to the rank in the target port configuration to the second port set.

In an implementation, the receiving, by the terminal device, update configuration information sent by the network device includes: receiving, by the terminal device, the update configuration information sent by the network device by using RRC signaling, a MAC CE, or DCI.

In an implementation, when calculating the CQI, the terminal device uses another port belonging to a same channel state information-reference signal CSI-RS resource to which the K ports belong as interference; or the terminal device does not use another port belonging to a same CSI-RS resource to which the K ports belong as interference.

According to a second aspect, a method for calculating a CQI is provided. The method includes: sending, by a network device, first configuration information to a terminal device, where the first configuration information indicates K ports used by the terminal device to calculate a channel quality indicator CQI, so that the terminal device determines the K ports in N ports according to the first configuration information, calculates the CQI based on the K ports, and reports the CQI and a rank, where the rank is equal to K, and K and N are positive integers; and receiving, by the network device, the CQI sent by the terminal device according to the first configuration information.

Therefore, the network device indicates the K ports used to calculate the CQI to the terminal device, so that the terminal device calculates the CQI based on the K ports, to obtain a more precise CQI, thereby improving communication performance.

In an implementation, the first configuration information includes a target port configuration used to calculate the CQI, the target port configuration includes correspondences between a plurality of ranks and a plurality of port sets, and port sets corresponding to different ranks in the plurality of ranks include different quantities of ports; and the target port configuration is used by the terminal device to determine a first port set corresponding to the rank, and the first port set includes the K ports.

In an implementation, the first configuration information includes identification information of the target port configuration used to calculate the CQI, and the identification information is used to identify the target port configuration; and the identification information is used by the terminal device to determine the target port configuration indicated by the identification information in a plurality of port configurations, each of the plurality of port configurations includes correspondences between a plurality of ranks and a plurality of port sets, and in each port configuration, port sets corresponding to different ranks include different quantities of ports; and the target port configuration is used by the terminal device to determine a first port set corresponding to the rank, and the first port set includes the K ports.

In an implementation, before the sending, by a network device, first configuration information to a terminal device, the method further includes: sending, by the network device, second configuration information to the terminal device, where the second configuration information includes the plurality of port configurations.

In an implementation, the sending, by the network device, second configuration information to the terminal device includes: sending, by the network device, the second configuration information to the terminal device by using Radio Resource Control RRC signaling and a MAC control element MAC CE.

In an implementation, the sending, by a network device, first configuration information to a terminal device includes: sending, by the network device, the first configuration information to the terminal device by using RRC signaling, a MAC CE, or downlink control information DCI.

In an implementation, port numbers of the K ports in the first port set are consecutive.

In an implementation, the port numbers of the K ports in the first port set are consecutive, a smallest port number M in the port numbers of the K ports satisfies M mod K=0, and M is a natural number.

In an implementation, port numbers of the K ports are 0 to K−1, or N−K to N−1.

In an implementation, the method further includes: sending, by the network device, update configuration information to the terminal device, where the update configuration information includes a second port set corresponding to the rank in the target port configuration, and the second port set is used by the terminal device to update the first port set corresponding to the rank in the target port configuration.

In an implementation, the sending, by the network device, update configuration information to the terminal device includes: sending, by the network device, the update configuration information to the terminal device by using RRC signaling, a MAC CE, or DCI.

According to a third aspect, a terminal device is provided. The terminal device may perform operations of the terminal device according to any one of the first aspect or optional implementations of the first aspect. Specifically, the terminal device may include module units configured to perform the operations of the terminal device according to any one of the first aspect or possible implementations of the first aspect.

According to a fourth aspect, a network device is provided. The network device may perform operations of the network device according to any one of the second aspect or optional implementations of the second aspect. Specifically, the network device may include module units configured to perform the operations of the network device according to any one of the second aspect or possible implementations of the second aspect.

According to a fifth aspect, a terminal device is provided. The terminal device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the execution causes the terminal device to perform the method according to the any one of first aspect or possible implementations of the first aspect, or the execution causes the terminal device to implement the terminal device according to the third aspect.

According to a sixth aspect, a network device is provided. The network device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the execution causes the network device to perform the method according to any one of the second aspect or possible implementations of the second aspect, or the execution causes the network device to implement the network device according to the fourth aspect.

According to a seventh aspect, a computer-readable storage medium is provided. The computer-readable storage medium stores a program, and the program causes a terminal device to perform the method for calculating a CQI according to any one of the first aspect and the implementations of the first aspect.

According to an eighth aspect, a computer-readable storage medium is provided. The computer-readable storage medium stores a program, and the program causes a network device to perform the method for calculating a CQI according to any one of the second aspect and the implementations of the second aspect.

According to a ninth aspect, a system chip is provided. The system chip includes an input interface, an output interface, a processor, and a memory. The processor is configured to execute an instruction stored in the memory, and when the instruction is executed, the processor may implement the method according to any one of the first aspect or possible implementations of the first aspect.

According to a tenth aspect, a system chip is provided. The system chip includes an input interface, an output interface, a processor, and a memory. The processor is configured to execute an instruction stored in the memory, and when the instruction is executed, the processor may implement the method according to any one of the second aspect or possible implementations of the second aspect.

According to an eleventh aspect, a computer program product including an instruction is provided. When the computer program product is run on a computer, the computer is caused to perform the method according to any one of the first aspect or possible implementations of the first aspect.

According to a twelfth aspect, a computer program product including an instruction is provided. When the computer program product is run on a computer, the computer is caused to perform the method according to any one of the second aspect or possible implementations of the second aspect.

DETAILED DESCRIPTION

The technical solutions in the implementations of this application are described below with reference to the accompanying drawings.

It should be understood that, the technical solutions of the implementations of this application may also be applied to various communications systems, for example, a Global System for Mobile communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a Long Term Evolution (Long Term Evolution, LTE) system, an LTE frequency division duplex (Frequency Division Duplex, FDD) system, LTE time division duplex (Time Division Duplex, TDD), a universal mobile telecommunication system (Universal Mobile Telecommunication System, UMTS) system, and a future 5G communications system.

This application describes the implementations with reference to a terminal device. The terminal device may alternatively be user equipment (User Equipment, UE), an access terminal, a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal device in a future 5G network, a terminal device in a future evolved public land mobile network (Public Land Mobile Network, PLMN), or the like.

This application describes the implementations with reference to a network device. The network device may be a device configured to communicate with a terminal device. For example, the network device may be a base transceiver station (Base Transceiver Station, BTS) in a GSM system or CDMA, or a NodeB (NodeB, NB) in a WCDMA system, or an evolved Node B (Evolutional Node B, eNB or eNodeB) in an LTE system. Alternatively, the network device may be a relay station, an access point, an in-vehicle device, a wearable device, a network side device in a future 5G network, a network side device in a future evolved PLMN network, or the like.

Figures 1, 2:
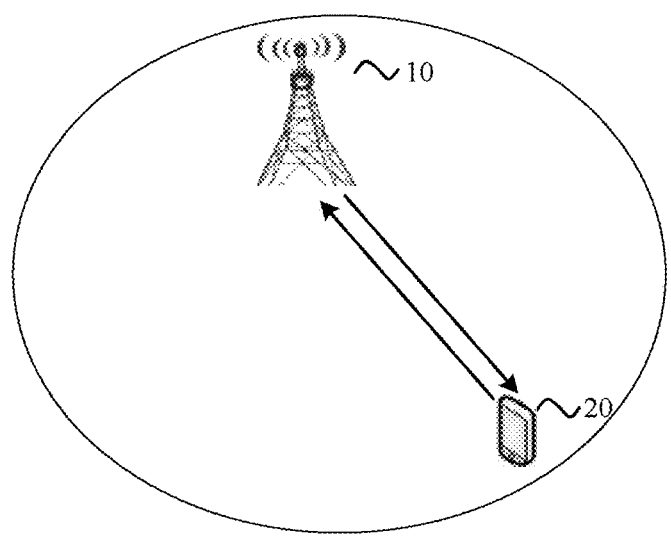
FIG. 1 is a schematic architectural diagram of an application scenario according to an implementation of this application.
FIG. 2 is a schematic flowchart of a method for calculating a CQI according to an implementation of this application.

FIG. 1 is a schematic diagram of an application scenario according to an implementation of this application. A communications system in FIG. 1 may include a network device 10 and a terminal device 20. The network device 10 is configured to: provide a communications service to the terminal device 20 and connect to a core network. The terminal device 20 is connected to a network by searching for a synchronization signal, a broadcast signal, and the like that are sent by the network device 10, to communicate with the network. An arrow shown in FIG. 1 may indicate uplink/downlink transmission performed over a cellular link between the terminal device 20 and the network device 10.

The network in this implementation of this application may be a public land mobile network (Public Land Mobile Network, PLMN), a device to device (Device to Device, D2D) network, a machine to machine/man (Machine to Machine/Man, M2M) network, or another network. FIG. 1 is an example of a simplified schematic diagram, and the network may further include another terminal device, which is not shown in FIG. 1.

In a future communications system, if channel reciprocity (channel reciprocity) is true, for a downlink (Downlink, DL), the terminal device does not need to feed back a channel precoding matrix indicator (Precoding Matrix Indicator, PMI) to the network device, so that signaling overheads are greatly reduced, and the network has more freedom to select a better precoding matrix.

However, because interference on a network side is different from interference on a terminal side, the terminal device still needs to notify the network of interference-related information, so that the network can select a relatively good modulation and coding scheme (Modulation and Coding Scheme, MCS) for transmission. Therefore, a CQI feedback is still necessary.

It is assumed that the network configures a CSI-RS resource used to transmit a channel state indication reference signal (Channel State Indication Reference Signals, CSI-RS), and the CSI-RS signal resource includes N ports. The terminal device may learn, according to measurement on the CSI-RS, of a channel corresponding to a downlink (Uplink, DL), also perform interference measurement by using an interference measurement resource (Interference Measurement Resource, IMR), calculate a CQI by comprehensively considering channel information and interference information, and report the CQI to the network.

Compared with an LTE system, a probability of using an MU-MIMO technology in a future communications system such as 5G or a new radio (New Radio, NR) communications system is greatly increased due to an increase of a quantity of antennas. Therefore, the MU-MIMO technology urgently needs to be optimized for this scenario.

In this implementation of this application, the network device indicates K ports used to calculate the CQI to the terminal device, so that the terminal device calculates the CQI based on the K ports in the N ports, to obtain a more precise CQI, thereby improving communication performance.

FIG. 2 is a schematic flowchart of a method for calculating a CQI according to an implementation of this application. The method shown in FIG. 2 may be performed by a terminal device. The terminal device may be, for example, the terminal device 20 shown in FIG. 1. As shown in FIG. 2, the method for calculating a CQI includes the following steps:

210: The terminal device determines K ports used to calculate a CQI in N ports.

220: The terminal device calculates the CQI based on the K ports.

230: The terminal device reports the CQI and a rank to a network device.

The rank (Rank, RI) is equal to K, and K and N are positive integers.

Therefore, the terminal device calculates the CQI based on the K ports in the N ports, to obtain a more precise CQI, thereby improving communication performance.

In 210, the determining, by the terminal device, K ports used to calculate a CQI in N ports includes: selecting, by the terminal device, the preconfigured K ports from the N ports according to the rank.

Port numbers of the K ports (port) are 0 to K−1, or N−K to N−1.

For example, the preconfigured K ports may be shown in Table 1. The port numbers of the K ports are respectively 0 to K−1. When values of ranks to be reported by the terminal device are different, the selected K ports are also different.

TABLE 1

| Rank | Port |
|---|---|
| RI = 1 | Port 0 |
| RI = 2 | Port 0 and a port 1 |
| ... | ... |

TABLE 1-continued

| Rank | Port |
|---|---|
| RI = K | Port 0, a port 1, . . . , and a port K |
| ... | ... |
| RI = N | Port 0, a port 1, . . . , a port K, . . . , and a port N |

For another example, the preconfigured K ports may be shown in Table 2. The port numbers of the K ports are respectively N−K to N−1. When values of ranks to be reported by the terminal device are different, the selected K ports are also different.

TABLE 2

| Rank | Port |
|---|---|
| RI = 1 | Port N − 1 |
| RI = 2 | Port N − 2 and a port N − 1 |
| ... | ... |
| RI = K | Port N − K, . . . , a port N − 2, and a port N − 1 |
| ... | ... |
| RI = N | Port 0, . . . , a port N − K, . . . , a port N − 2, and a port N − 1 |

Further, if K is an odd number, the port numbers of the K ports are 0 to K−1; or if K is an even number, the port numbers of the K ports are N−K to N−1; or if K is an even number, the port numbers of the K ports are 0 to K−1; or if K is an odd number, the port numbers of the K ports are N−K to N−1.

The method further includes: sending, by the terminal device, information about the selected K ports to the network device.

In other words, the terminal device may select the K ports from the N ports, and send the information about the K ports selected by the terminal device to the network device through particular uplink transmission.

Before 210, to be specific, before the determining, by the terminal device, K ports used to calculate a CQI in N ports, the method further includes: receiving, by the terminal device, first configuration information sent by the network device, where the first configuration information is used to indicate the information about the K ports.

In 210, the determining, by the terminal device, K ports used to calculate a CQI in N ports includes: determining, by the terminal device, the K ports in the N ports according to the first configuration information.

In this implementation, the network device sends the first configuration information to the terminal device to indicate the information about the K ports. The network device may indicate the information about the K ports to the terminal device in two manners, which are respectively described below.

Manner 1

The first configuration information includes a target port configuration used to calculate the CQI, the target port configuration includes correspondences between a plurality of ranks and a plurality of port sets, and port sets corresponding to different ranks in the plurality of ranks include different quantities of ports.

In 210, the determining, by the terminal device, the K ports in the N ports according to the first configuration information includes: determining, by the terminal device according to the target port configuration and the rank, a first port set corresponding to the rank, where the first port set includes the K ports.

The network device may directly indicate, to the terminal device by using the first configuration information, a port configuration, namely, the target port configuration, used to calculate the CQI. The target port configuration includes the correspondences between the plurality of ranks and the plurality of port sets. For example, the target port configuration may be a port configuration shown in Table 1 or Table 2. The terminal device determines, according to the target port configuration and the rank that needs to be reported, a port set, namely, the first port set, corresponding to the rank in the target port configuration; and calculates the CQI based on a port in the first port set. In the target port configuration, the plurality of ranks and the plurality of port sets are in a one-to-one correspondence, and the port sets corresponding to the different ranks include the different quantities of ports. For example, when the rank is K, the corresponding first port set includes the K ports.

Manner 2

The first configuration information includes identification information of the target port configuration used to calculate the CQI, and the identification information is used to identify the target port configuration.

In 210, the determining, by the terminal device, the K ports in the N ports according to the first configuration information includes:

determining, by the terminal device according to the identification information, the target port configuration indicated by the identification information in a plurality of port configurations, where each of the plurality of port configurations includes correspondences between a plurality of ranks and a plurality of port sets, and in each port configuration, port sets corresponding to different ranks include different quantities of ports; and determining, by the terminal device according to the target port configuration and the rank, a first port set corresponding to the rank, where the first port set includes the K ports.

The terminal device may pre-store the plurality of port configurations, the network device may indicate, to the terminal device by using the first configuration information, the identification information of the target port configuration used to calculate the CQI, and the identification information is used to identify the target port configuration, so that the terminal device can find, according to the identification information, the target port configuration indicated by the identification information from the plurality of port configurations. Each of the plurality of port configurations includes the correspondences between the plurality of ranks and the plurality of port sets, the plurality of ranks and the plurality of port sets in each port configuration are in a one-to-one correspondence, and port sets corresponding to a same rank in different port configurations may be different. The terminal device calculates the CQI based on the target port configuration and the K ports in the first port set corresponding to the rank K.

It should be understood that, when there are a plurality of port sets corresponding to the rank K, the terminal device may select one from the port sets corresponding to the rank K as the first port set used to calculate the CQI.

The port numbers of the K ports in the first port set are 0 to K−1.

The port numbers of the K ports in the first port set are N−K to N−1.

The port numbers of the K ports in the first port set are consecutive.

The port numbers of the K ports in the first port set are consecutive, a smallest port number M in the port numbers of the K ports satisfies M mod K=0, and M is a natural number.

For example, the plurality of port configurations may include four types of port configurations shown in Table 1, Table 2, Table 3, and Table 4. The plurality of port configurations may be notified by the network device to the terminal device by using the second configuration information, or may be pre-stored in the terminal device. For example, the plurality of port configurations may be agreed on in a protocol. The terminal device may select, according to the identification information carried in the first configuration information, the first port set corresponding to the rank RI=K from the target port configuration indicated by the identification information; and calculate the CQI based on the K ports in the first port set.

In Table 1, port numbers of ports in a port set corresponding to the rank K are port 0 to port K−1.

In Table 2, port numbers of ports in a port set corresponding to the rank K are port N−K to port N−1.

In Table 3, port numbers of ports in each port set are consecutive.

For example, when RI=2, the terminal device may select one from a plurality of port sets (port 0, port 1), (port 1, port 2), . . . , and (port N−2, port N−1) (which may further include (port N−1, port 0)) that correspond to RI=2 as the first port set used to calculate the CQI.

When RI=3, the terminal device may select one from a plurality of port sets (port 0, port 1, port 2), (port 1, port 2, port 3), . . . , and (port N−3, port N−2, port N−1) (which may further include (port N−1, port 0, port 1) and (port N−2, port N−1, port 0)) that correspond to RI=3 as the first port set used to calculate the CQI.

In Table 4, port numbers of ports in each port set are consecutive, and a smallest port number in the port set is 0 or is an integer multiple of a value of a rank corresponding to the port set.

For example, when RI=2, the terminal device may select one from a plurality of port sets (port 0, port 1), (port 2, port 3), . . . , and (port N−2, port N−1) (which may further include (port N−1, port 0)) that correspond to RI=2 as the first port set used to calculate the CQI.

When RI=3, the terminal device may select one from a plurality of port sets (port 0, port 1, port 2), (port 3, port 4, port 5), . . . , and (port N−3, port N−2, port N−1) (which may further include (port N−1, port 0, port 1) or (port N−2, port N−1, port 0)) that correspond to RI=3 as the first port set used to calculate the CQI.

The network device configures an N-port CSI-RS signal for the terminal device, and the terminal device performs port selection in the N ports and calculates the CQI. Assuming that N=4 and port numbers of the four ports are port 1, port 2, port 3, and port 4, Table 3 and Table 4 may be shown as follows:

TABLE 3

| Rank | Port |
| --- | --- |
| RI = 1 | Port 0 or a port 1 or a port 2 or a port 3 |
| RI = 2 | (port 0, port 1) or |
|  | (port 1, port 2) or |
|  | (port 2, port 3) or |
|  | (port 3, port 0) |
| RI = 3 | (port 0, port 1, port 2) or |
|  | (port 1, port 2, port 3) or |
|  | (port 2, port 3, port 0) or |
|  | (port 3, port 0, port 1) |

TABLE 3-continued

| Rank | Port |
| --- | --- |
| RI = 4 | (port 0, port 1, port 2, port 3) or<br>(port 1, port 2, port 3, port 0) or<br>(port 2, port 3, port 0, port 1) or<br>(port 3, port 0, port 1, port 2) |

TABLE 4

| Rank | Port |
| --- | --- |
| RI = 1 | Port 0 or a port 1 or a port 2 or a port 3 |
| RI = 2 | (port 0, port 1) or (port 2, port 3) |
| RI = 3 | (port 0, port 1, port 2) or (port 3, port 0, port 1) |
| RI = 4 | (port 0, port 1, port 2, port 3) |

It should be understood that, Table 1 to Table 4 are merely examples. In each port configuration, a port set corresponding to a rank may alternatively be in another form. When a rank corresponds to a plurality of port sets (for example, in Table 3 and Table 4), the terminal device may select one from the plurality of possible port sets as the first port set used to calculate the CQI. Further, the terminal device may report information about the selected port to the network device in particular uplink transmission. When a rank corresponds to a port set (for example, in Table 1 and Table 2), the terminal device calculates the CQI based on a port in the port set corresponding to the rank.

Before the receiving, by the terminal device, first configuration information sent by the network device, the method further includes: receiving, by the terminal device, second configuration information sent by the network device, where the second configuration information includes the plurality of port configurations.

The receiving, by the terminal device, second configuration information sent by the network device includes: receiving, by the terminal device, the second configuration information sent by the network device by using Radio Resource Control (Radio Resource Control, RRC) signaling and a Medium Access Control (Medium Access Control, MAC) control element (Control Element, CE).

The receiving, by the terminal device, first configuration information sent by the network device includes: receiving, by the terminal device, the first configuration information sent by the network device by using RRC signaling, a MAC CE, or downlink control information (Download Control Information, DCI).

For example, the network device may send the second configuration information to the terminal device by using the RRC signaling, to indicate the plurality of port configurations, and send the first configuration information to the terminal device by using the MAC CE, to indicate the identification information of the target port configuration used to calculate the CQI. For another example, the network device may send the second configuration information to the terminal device by using the RRC signaling, to indicate the plurality of port configurations, and send the first configuration information to the terminal device by using the DCI, to indicate the identification information of the target port configuration used to calculate the CQI.

For another example, the network device may send the second configuration information to the terminal device by using the MAC CE, to indicate the plurality of port configurations, and send the first configuration information to the terminal device by using the DCI, to indicate the identification information of the target port configuration used to calculate the CQI.

For another example, the network device may directly send the first configuration information to the terminal device by using the RRC signaling, to indicate the target port configuration used to calculate the CQI.

For another example, the network device may directly send the first configuration information to the terminal device by using the MAC CE, to indicate the target port configuration used to calculate the CQI.

For another example, the network device may directly send the first configuration information to the terminal device by using the DCI, to indicate the target port configuration used to calculate the CQI.

In the plurality of port configurations, each port configuration may be updated.

The method further includes: receiving, by the terminal device, update configuration information sent by the network device, where the update configuration information includes a second port set corresponding to the rank in the target port configuration; and updating, by the terminal device, the first port set corresponding to the rank in the target port configuration to the second port set.

The receiving, by the terminal device, update configuration information sent by the network device includes: receiving, by the terminal device, the update configuration information sent by the network device by using RRC signaling, a MAC CE, or DCI.

For example, the network device may send the first configuration information to the terminal device by using the RRC signaling, and send the update configuration information to the terminal device by using the MAC CE or the DCI.

For another example, the network device may send the first configuration information to the terminal device by using the MAC CE, and send the update configuration information to the terminal device by using the DCI.

For another example, the network device may send the first configuration information to the terminal device by using the DCI, and send the update configuration information to the terminal device by using the DCI.

In 230, when calculating the CQI based on the K ports, the terminal device uses another port belonging to a CSI-RS resource to which the K ports belong as interference; or the terminal device may not use another port belonging to a same CSI-RS resource to which the K ports belong as interference.

For example, the network device configures a 4-port CSI-RS signal for the terminal device to perform channel measurement. If the terminal device selects two from the four ports to calculate the CQI, when the terminal device calculates the CQI according to the two selected ports, other two ports belonging to a same CSI-RS resource to which the two selected ports belong may be used as interference, that is, the interference is from the other two ports and another port outside the CSI-RS resource; or other two ports belonging to a same CSI-RS resource to which the two selected ports belong may not be used as interference, that is, the interference is from only another port outside the CSI-RS resource.

Figure 3:
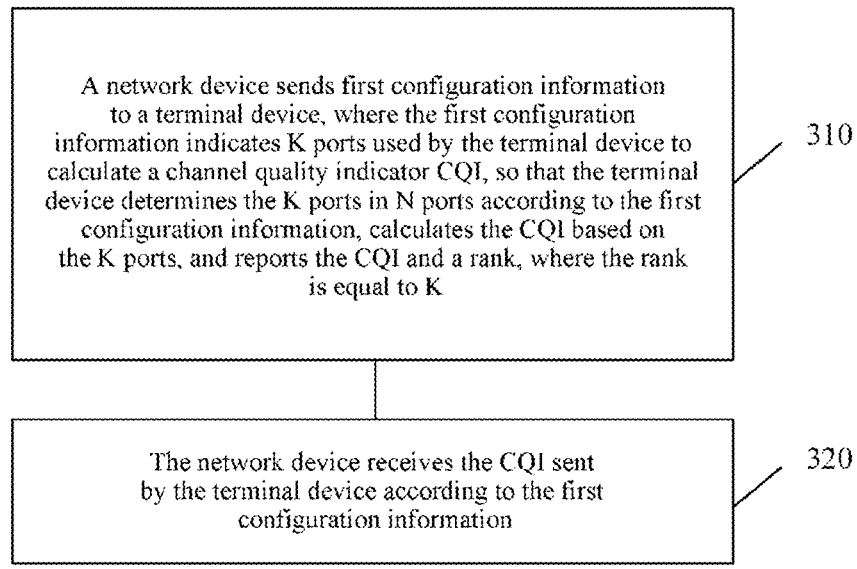
FIG. 3 is a schematic flowchart of a method for calculating a CQI according to an implementation of this application.

FIG. 3 is a schematic flowchart of a method for calculating a CQI according to an implementation of this application. The method shown in FIG. 3 may be performed by a network device. The network device may be, for example, the network device 10 shown in FIG. 1. As shown in FIG. 3, the method for calculating a CQI includes the following steps:

310: The network device sends first configuration information to a terminal device, where the first configuration information indicates K ports used by the terminal device to calculate a channel quality indicator CQI, so that the terminal device determines the K ports in N ports according to the first configuration information, calculates the CQI based on the K ports, and reports the CQI and a rank, where the rank is equal to K, and K and N are positive integers.

320: The network device receives the CQI sent by the terminal device according to the first configuration information.

Therefore, the network device indicates the K ports used to calculate the CQI to the terminal device, so that the terminal device calculates the CQI based on the K ports, to obtain a more precise CQI, thereby improving communication performance.

The first configuration information includes a target port configuration used to calculate the CQI, the target port configuration includes correspondences between a plurality of ranks and a plurality of port sets, and port sets corresponding to different ranks in the plurality of ranks include different quantities of ports; and the target port configuration is used by the terminal device to determine a first port set corresponding to the rank, and the first port set includes the K ports.

The first configuration information includes identification information of the target port configuration used to calculate the CQI, and the identification information is used to identify the target port configuration; the identification information is used by the terminal device to determine the target port configuration indicated by the identification information in a plurality of port configurations, each of the plurality of port configurations includes correspondences between a plurality of ranks and a plurality of port sets, and in each port configuration, port sets corresponding to different ranks include different quantities of ports; and the target port configuration is used by the terminal device to determine a first port set corresponding to the rank, and the first port set includes the K ports.

Before the sending, by the network device, first configuration information to a terminal device, the method further includes: sending, by the network device, second configuration information to the terminal device, where the second configuration information includes the plurality of port configurations.

The sending, by the network device, second configuration information to the terminal device includes: sending, by the network device, the second configuration information to the terminal device by using Radio Resource Control RRC signaling and a MAC control element MAC CE.

The sending, by the network device, first configuration information to a terminal device includes: sending, by the network device, the first configuration information to the terminal device by using RRC signaling, a MAC CE, or downlink control information DCI.

Port numbers of the K ports in the first port set are consecutive.

The port numbers of the K ports in the first port set are consecutive, a smallest port number M in the port numbers of the K ports satisfies M mod K=0, and M is a natural number.

Port numbers of the K ports are 0 to K−1, or N−K to N−1.

The method further includes: sending, by the network device, update configuration information to the terminal device, where the update configuration information includes a second port set corresponding to the rank in the target port configuration, and the second port set is used by the terminal device to update the first port set corresponding to the rank in the target port configuration.

The sending, by the network device, update configuration information to the terminal device includes: sending, by the network device, the update configuration information to the terminal device by using RRC signaling, a MAC CE, or DCI.

It should be understood that, for details in a process of calculating the CQI that is indicated by the network device to the terminal device, refer to related descriptions of the terminal device in FIG. 2. For brevity, details are not described herein again.

It should be understood that sequence numbers of the foregoing processes do not mean execution sequences in various implementations of this application. The execution sequences of the processes should be determined according to functions and internal logic of the processes, and should not be construed as any limitation on the implementation processes of the implementations of this application.

The carrier selection method according to the implementations of this application is described above in detail. Apparatuses according to the implementations of this application are described below with reference to FIG. 4 to FIG. 7. Technical features described in the method implementations are applicable to the following apparatus implementations.

Figure 4:
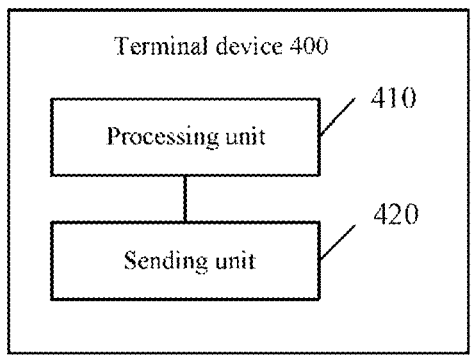
FIG. 4 is a schematic block diagram of a terminal device according to an implementation of this application.

FIG. 4 is a schematic block diagram of a terminal device 400 according to an implementation of this application. As shown in FIG. 4, the terminal device 400 includes a processing unit 410 and a sending unit 420.

The processing unit 410 is configured to determine K ports used to calculate a channel quality indicator CQI in N ports; and calculate the CQI based on the K ports.

The sending unit 420 is configured to report the CQI and a rank to a network device, where the rank is equal to K, and K and N are positive integers.

Therefore, the terminal device calculates the CQI based on the K ports in the N ports, to obtain a more precise CQI, thereby improving communication performance.

The processing unit 410 is further configured to select the preconfigured K ports from the N ports according to the rank.

Port numbers of the K ports are 0 to K−1, or N−K to N−1.

If K is an odd number, the port numbers of the K ports are 0 to K−1; or if K is an even number, the port numbers of the K ports are N−K to N−1; or if K is an even number, the port numbers of the K ports are 0 to K−1; or if K is an odd number, the port numbers of the K ports are N−K to N−1.

The sending unit 420 is further configured to send information about the selected K ports to the network device.

The terminal device further includes a receiving unit 430, and the receiving unit 430 is configured to receive first configuration information sent by the network device, where the first configuration information is used to indicate the information about the K ports, and the processing unit 410 is configured to determine the K ports in the N ports according to the first configuration information.

The first configuration information includes a target port configuration used to calculate the CQI, the target port configuration includes correspondences between a plurality of ranks and a plurality of port sets, and port sets corresponding to different ranks in the plurality of ranks include different quantities of ports; and the processing unit 410 is configured to determine, according to the target port configuration and the rank, a first port set corresponding to the rank, where the first port set includes the K ports.

The first configuration information includes identification information of the target port configuration used to calculate the CQI, and the identification information is used to identify the target port configuration; and the processing unit 410 is configured to: determine, according to the identification information, the target port configuration indicated by the identification information in a plurality of port configurations, where each of the plurality of port configurations includes correspondences between a plurality of ranks and a plurality of port sets, and in each port configuration, port sets corresponding to different ranks include different quantities of ports; and determine, according to the target port configuration and the rank, a first port set corresponding to the rank, where the first port set includes the K ports.

The receiving unit 430 is further configured to receive second configuration information sent by the network device, where the second configuration information includes the plurality of port configurations.

The receiving unit 430 is configured to receive the second configuration information sent by the network device by using Radio Resource Control RRC signaling and a MAC control element MAC CE.

The receiving unit 430 is configured to receive the first configuration information sent by the network device by using RRC signaling, a MAC CE, or downlink control information DCI.

Port numbers of the K ports in the first port set are consecutive.

The port numbers of the K ports in the first port set are consecutive, a smallest port number M in the port numbers of the K ports satisfies M mod K=0, and M is a natural number.

Port numbers of the K ports are 0 to K−1, or N−K to N−1.

The receiving unit 430 is further configured to receive update configuration information sent by the network device, where the update configuration information includes a second port set corresponding to the rank in the target port configuration, and the processing unit 410 is further configured to update the first port set corresponding to the rank in the target port configuration to the second port set.

The receiving unit 430 is configured to receive the update configuration information sent by the network device by using RRC signaling, a MAC CE, or DCI.

When calculating the CQI, the processing unit 410 uses another port belonging to a same channel state indication reference signal CSI-RS resource to which the K ports belong as interference; or the processing unit 410 does not use another port belonging to a same CSI-RS resource to which the K ports belong as interference.

It should be understood that, the terminal device 400 may perform corresponding operations in the method 200 performed by the terminal device in the foregoing method implementations. For brevity, details are not described herein again.

Figure 5:
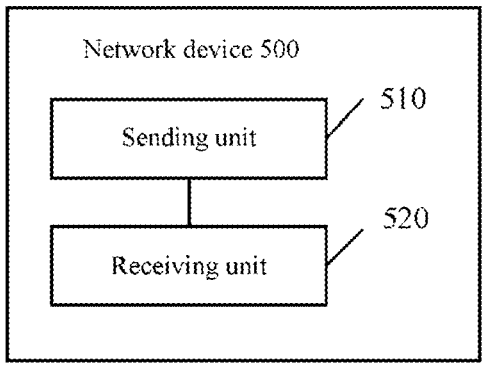
FIG. 5 is a schematic block diagram of a network device according to an implementation of this application.

FIG. 5 is a schematic block diagram of a network device 500 according to an implementation of this application. As shown in FIG. 5, the network device 500 includes a sending unit 510 and a receiving unit 520.

The sending unit 510 is configured to send first configuration information to a terminal device, where the first configuration information indicates K ports used by the terminal device to calculate a channel quality indicator CQI, so that the terminal device determines the K ports in N ports according to the first configuration information, calculates the CQI based on the K ports, and reports the CQI and a rank, where the rank is equal to K, and K and N are positive integers.

The receiving unit 520 is configured to receive the CQI sent by the terminal device according to the first configuration information.

Therefore, the network device indicates the K ports used to calculate the CQI to the terminal device, so that the terminal device calculates the CQI based on the K ports, to obtain a more precise CQI, thereby improving communication performance.

The first configuration information includes a target port configuration used to calculate the CQI, the target port configuration includes correspondences between a plurality of ranks and a plurality of port sets, and port sets corresponding to different ranks in the plurality of ranks include different quantities of ports; and the target port configuration is used by the terminal device to determine a first port set corresponding to the rank, and the first port set includes the K ports.

The first configuration information includes identification information of the target port configuration used to calculate the CQI, and the identification information is used to identify the target port configuration; the identification information is used by the terminal device to determine the target port configuration indicated by the identification information in a plurality of port configurations, each of the plurality of port configurations includes correspondences between a plurality of ranks and a plurality of port sets, and in each port configuration, port sets corresponding to different ranks include different quantities of ports; and the target port configuration is used by the terminal device to determine a first port set corresponding to the rank, and the first port set includes the K ports.

The sending unit 510 is further configured to send second configuration information to the terminal device, where the second configuration information includes the plurality of port configurations.

The sending unit 510 is configured to send the second configuration information to the terminal device by using Radio Resource Control RRC signaling and a MAC control element MAC CE.

The sending unit 510 is configured to send the first configuration information to the terminal device by using RRC signaling, a MAC CE, or downlink control information DCI.

Port numbers of the K ports in the first port set are consecutive.

The port numbers of the K ports in the first port set are consecutive, a smallest port number M in the port numbers of the K ports satisfies M mod K=0, and M is a natural number.

Port numbers of the K ports are 0 to K−1, or N−K to N−1.

The sending unit 510 is further configured to send update configuration information to the terminal device, where the update configuration information includes a second port set corresponding to the rank in the target port configuration, and the second port set is used by the terminal device to update the first port set corresponding to the rank in the target port configuration.

The sending unit 510 is configured to send the update configuration information to the terminal device by using RRC signaling, a MAC CE, or DCI.

It should be understood that, the network device 500 may perform corresponding operations in the method 300 performed by the network device in the foregoing method implementations. For brevity, details are not described herein again.

Figure 6:
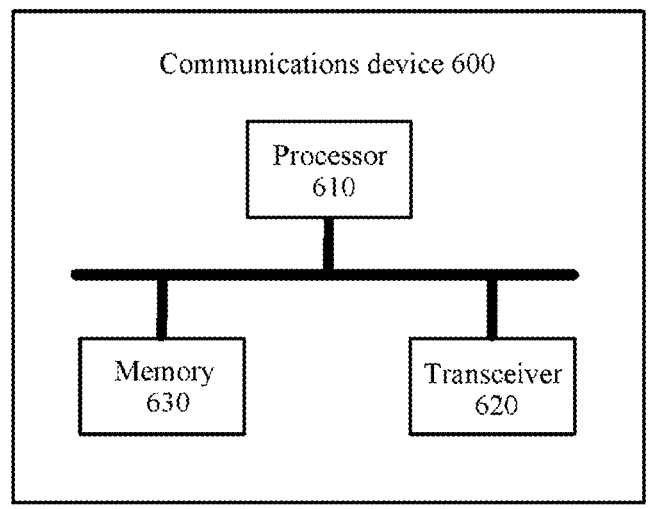
FIG. 6 is a schematic structural diagram of a communications device according to an implementation of this application.

FIG. 6 is a schematic structural diagram of a communications device 600 according to an implementation of this application. As shown in FIG. 6, the communications device includes a processor 610, a transceiver 620, and a memory 630. The processor 610, the transceiver 620, and the memory 630 communicate with each other through an internal connection path. The memory 630 is configured to store an instruction, and the processor 610 is configured to execute the instruction stored in the memory 630, to control the transceiver 620 to receive a signal or send a signal.

The processor 610 may invoke program code stored in the memory 630, to perform corresponding operations in the method 200 performed by the terminal device in the method implementations. For brevity, details are not described herein again.

The processor 610 may invoke program code stored in the memory 630, to perform corresponding operations in the method 300 performed by the network device in the method implementations. For brevity, details are not described herein again.

It should be understood that, the processor in this implementation of this application may be an integrated circuit chip having a signal processing capability. In an implementation process, the steps of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, steps and logical block diagrams disclosed in this implementation of this application. The general purpose processor may be a microprocessor, or the processor may alternatively be any conventional processor, or the like. The steps of the method disclosed with reference to this implementation of this application may be directly implemented by a hardware decoding processor, or may be implemented by a combination of hardware and software modules in the decoding processor. The software module may be located in a mature storage medium in the field, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor.

It may be understood that, the memory in this implementation of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory in the systems and methods described in this specification is aimed at including but being not limited to these and any memory of another proper type.

Figure 7:
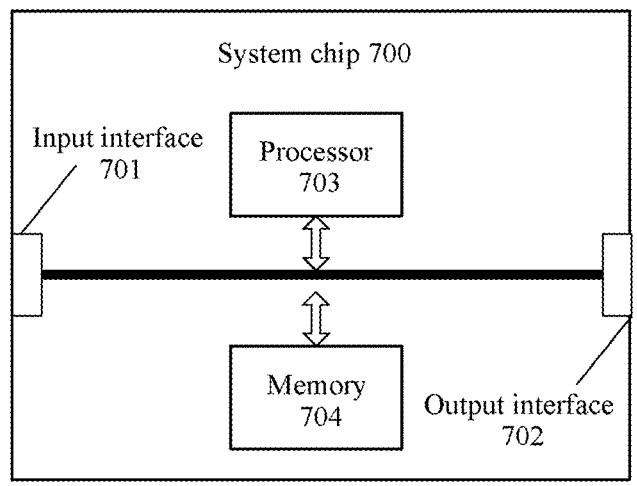
FIG. 7 is a schematic structural diagram of a system chip according to an implementation of this application.

FIG. 7 is a schematic structural diagram of a system chip according to an implementation of this application. The system chip 700 in FIG. 7 includes an input interface 701, an output interface 702, at least one processor 703, and a memory 704. The input interface 701, the output interface 702, the processor 703, and the memory 704 are connected to each other through an internal connection path. The processor 703 is configured to execute code stored in the memory 704.

When the code is executed, the processor 703 may implement the method 200 performed by the terminal device in the method implementations. For brevity, details are not described herein again.

When the code is executed, the processor 703 may implement the method 300 performed by the network device in the method implementations. For brevity, details are not described herein again.

A person of ordinary skill in the art may be aware that, in combination with the examples of units and algorithm steps described in the implementations disclosed in this specification, this application may be implemented by using electronic hardware or a combination of computer software and electronic hardware. Whether the functions are implemented by using hardware or software depends on a particular application and a design constraint condition of the technical solution. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method implementations, and details are not described herein again.

In the several implementations provided in this application, it should be understood that the disclosed system, apparatus, and method may be implemented in other manners. For example, the described apparatus implementations are merely schematic. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the implementations.

In addition, functional units in the implementations of this application may be integrated into one monitoring unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or some of the steps of the methods described in the implementations of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What we claim is:

1. A method for calculating a Channel Quality Indicator (CQI), comprising:
   determining, by a terminal device, K ports for a rank, wherein K is equal to a value of the rank the value of the rank belongs to 1 to N, N is a number of ports in a channel state information-reference signal (CSI-RS) resource, and K and N are positive integers;
   calculating, by the terminal device, the CQI for the rank based on the K ports; and
   reporting, by the terminal device, the CQI and the rank to a network device.

2. The method according to claim 1, wherein the determining, by a terminal device, K ports for a rank comprises:
   selecting, by the terminal device, K ports from the N ports according to the rank.

3. The method according to claim 2, wherein port numbers of the K ports are 0 to K−1.

4. The method according to claim 1, wherein before the determining, by a terminal device, K ports for a rank, the method further comprises:
   receiving, by the terminal device, first configuration information sent by the network device, wherein the first configuration information is used for indicating a sequence comprising the port information of the K ports; and
   the determining, by a terminal device, K ports for a rank comprises:
   determining, by the terminal device, the K ports in the N ports according to the first configuration information.

5. The method according to claim 4, wherein the first configuration information comprises a port configuration used for calculating the CQI, the port configuration comprises correspondences between a plurality of ranks and a plurality of port sets, and port sets corresponding to different ranks in the plurality of ranks comprise different quantities of ports; and
   the determining, by the terminal device, the K ports in the N ports according to the first configuration information comprises:
   determining, by the terminal device according to the port configuration and the rank in the plurality of ranks, a first port set corresponding to the rank in the plurality of ranks, wherein the first port set comprises the K ports.

6. The method according to claim 4, wherein the receiving, by the terminal device, first configuration information sent by the network device comprises:
   receiving, by the terminal device, the first configuration information sent by the network device by using Radio Resource Control (RRC) signaling.

7. The method according to claim 5, wherein the method further comprises:
   receiving, by the terminal device, update configuration information sent by the network device, wherein the update configuration information comprises a second port set corresponding to the rank in the plurality of ranks in the port configuration; and
   updating, by the terminal device, the first port set corresponding to the rank in the plurality of ranks in the port configuration to the second port set.

8. The method according to claim 7, wherein the receiving, by the terminal device, update configuration information sent by the network device comprises:
   receiving, by the terminal device, the update configuration information sent by the network device by using RRC signaling.

9. A terminal device, comprising: a processor and a transceiver, wherein
   the processor is configured to:
   determine K ports for a rank, wherein K is equal to a value of the rank, the value of the rank belongs to 1 to N, N is a number of ports in a channel state information-reference signal (CSI-RS) resource, and K and N are positive integers, and
   calculate a Channel Quality Indicator (CQI) for the rank based on the K ports; and
   the transceiver is configured to report the CQI and the rank to a network device.

10. The terminal device according to claim 9, wherein the processor is further configured to:
    select K ports from the N ports according to the rank.

11. The terminal device according to claim 10, wherein port numbers of the K ports are 0 to K−1.

12. The terminal device according to claim 9, wherein the transceiver is further configured to:
    receive first configuration information sent by the network device, wherein the first configuration information is used for indicating a sequence comprising the port information of the K ports, and
    the processor is configured to:
    determine the K ports in the N ports according to the first configuration information.

13. The terminal device according to claim 12, wherein the first configuration information comprises a port configuration used for calculating the CQI, the port configuration comprises correspondences between a plurality of ranks and a plurality of port sets, and port sets corresponding to different ranks in the plurality of ranks comprise different quantities of ports; and
    the processor is configured to:
    determine, according to the port configuration and the rank in the plurality of ranks, a first port set corresponding to the rank in the plurality of ranks, wherein the first port set comprises the K ports.

14. The terminal device according to claim 12, wherein the transceiver is configured to:
receive the first configuration information sent by the network device by using Radio Resource Control (RRC) signaling.

15. The terminal device according to claim 13, wherein the transceiver is further configured to:
receive update configuration information sent by the network device, wherein the update configuration information comprises a second port set corresponding to the rank in the plurality of ranks in the port configuration, and the processor is further configured to:
update the first port set corresponding to the rank in the plurality of ranks in the port configuration to the second port set.

16. The terminal device according to claim 15, wherein the transceiver is configured to:
receive the update configuration information sent by the network device by using RRC signaling.

\* \* \* \* \*